United States Patent
Seo et al.

(10) Patent No.: US 10,696,766 B2
(45) Date of Patent: Jun. 30, 2020

(54) STYRENE-ACRYLONITRILE RESIN WITH HIGH THERMAL RESISTANCE AND METHOD FOR PRODUCING THE SAME

(71) Applicant: LG CHEM, LTD., Seoul (KR)

(72) Inventors: Jae Bum Seo, Daejeon (KR); Dae Woo Lee, Daejeon (KR); Jung Tae Park, Daejeon (KR); Gyu Sun Kim, Daejeon (KR); Chang Hun Han, Daejeon (KR)

(73) Assignee: LG CHEM, LTD., Seoul (KR)

( * ) Notice: Subject to any disclaimer, the term of this patent is extended or adjusted under 35 U.S.C. 154(b) by 170 days.

(21) Appl. No.: 15/776,756

(22) PCT Filed: Sep. 6, 2017

(86) PCT No.: PCT/KR2017/009780
§ 371 (c)(1),
(2) Date: May 16, 2018

(87) PCT Pub. No.: WO2018/084417
PCT Pub. Date: May 11, 2018

(65) Prior Publication Data
US 2018/0355085 A1    Dec. 13, 2018

(30) Foreign Application Priority Data

Nov. 1, 2016 (KR) .................. 10-2016-0144510

(51) Int. Cl.
*C08F 2/00* (2006.01)
*C08F 212/10* (2006.01)
(Continued)

(52) U.S. Cl.
CPC ............ *C08F 212/10* (2013.01); *C08F 2/001* (2013.01); *C08F 2/01* (2013.01); *C08F 2/06* (2013.01);
(Continued)

(58) Field of Classification Search
None
See application file for complete search history.

(56) References Cited

U.S. PATENT DOCUMENTS 5,489,657 A    2/1996    Sue et al.
2010/0324231 A1    12/2010    Yamashita et al.

FOREIGN PATENT DOCUMENTS

CN    101058624    10/2007
JP    H0539323 A    2/1993
(Continued)

OTHER PUBLICATIONS

International Search Report for International Patent Application No. PCT/KR2017/009780, filed on Sep. 6, 2017.
(Continued)

*Primary Examiner* — Richard A Huhn

(57) ABSTRACT

The present invention provides a styrene-acrylonitrile (SAN) resin that exhibits significantly improved thermal resistance and, at the same time, can be produced at high productivity and is highly processable and highly moldable; and a method of producing the same by preparing and storing the solution containing a mixture of an N-substituted maleimide monomer and an unsaturated nitrile monomer at a particular temperature, introducing the solution and a styrene polymer into the polymerization reactor separately, and maintaining the first polymerization reactor and the second polymerization reactor at particular respective temperatures, thereby significantly reducing the amounts of oligomers contained in the SAN resin.

13 Claims, 1 Drawing Sheet

(51) Int. Cl.
*C08F 220/52* (2006.01)
*C08F 212/08* (2006.01)
*C08F 212/14* (2006.01)
*C08F 2/01* (2006.01)
*C08F 2/06* (2006.01)
*C08F 2/38* (2006.01)
*C08F 6/10* (2006.01)
*C08K 5/14* (2006.01)
*C08K 5/23* (2006.01)
*C08K 5/37* (2006.01)

(52) U.S. Cl.
CPC ............ *C08F 2/38* (2013.01); *C08F 6/10* (2013.01); *C08F 212/08* (2013.01); *C08F 212/14* (2013.01); *C08K 5/14* (2013.01); *C08K 5/23* (2013.01); *C08K 5/37* (2013.01); *C08F 220/52* (2013.01)

(56) References Cited

FOREIGN PATENT DOCUMENTS

| | | |
|---|---|---|
| JP | H06128224 A | 5/1994 |
| JP | H06239834 A | 8/1994 |
| JP | H08-157536 A | 6/1996 |
| JP | H09316051 A | 12/1997 |
| JP | 2000-198902 A | 7/2000 |
| JP | 2010505022 A | 2/2010 |
| JP | 2010530020 A | 9/2010 |
| KR | 10-1996-0005078 B1 | 4/1996 |
| KR | 10-1998-0027068 A | 7/1998 |
| KR | 20080060750 A | 7/2008 |
| KR | 10-2011-0042713 A | 4/2011 |
| KR | 10-2011-0063947 A | 6/2011 |
| KR | 20110063947 A * | 6/2011 |

OTHER PUBLICATIONS

Search Report dated Oct. 11, 2018 for European Application No. 17863299.8.

* cited by examiner

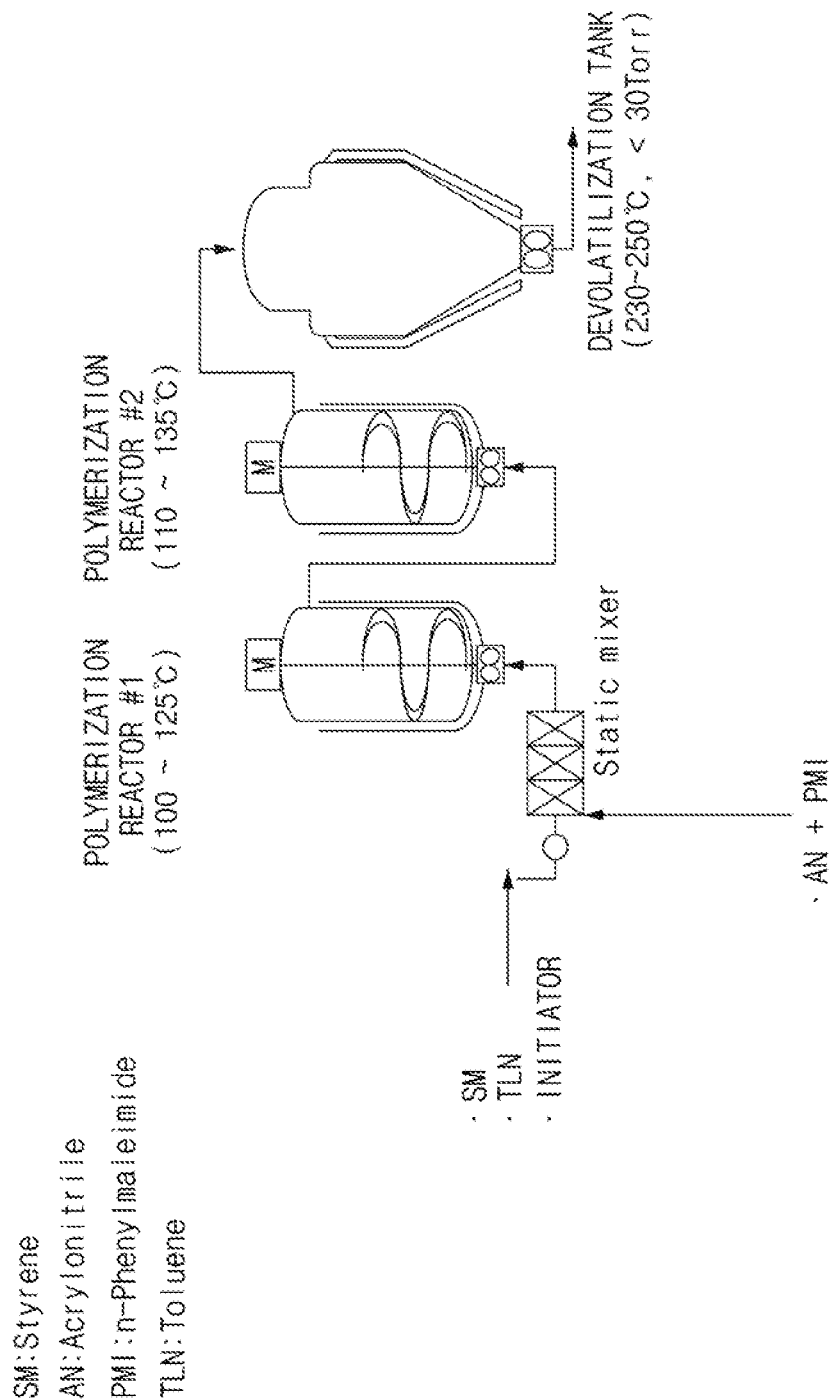

STYRENE-ACRYLONITRILE RESIN WITH HIGH THERMAL RESISTANCE AND METHOD FOR PRODUCING THE SAME

CROSS-REFERENCE TO RELATED APPLICATION

This application is a U.S. National Stage of International Patent Application No. PCT/KR2017/009780, filed Sep. 6, 2017, which claims priority to and the benefit of Korean Patent Application No. 10-2016-0144510, filed on Nov. 1, 2016, the disclosure of which is incorporated herein by reference in its entirety.

TECHNICAL FIELD

The present invention relates to a styrene-acrylonitrile (SAN) resin with high thermal resistance and a method for producing the same.

Background Art

An acrylonitrile-butadiene-styrene (hereinafter referred to as ABS) thermoplastic resin has excellent material properties such as impact resistance, processability, surface gloss, chemical resistance (e.g., drug resistance), and molding processability and thus is widely used in a variety of office equipment, electrical/electronic parts, automotive interior/exterior materials, etc.

A styrene-acrylonitrile (hereinafter referred to as SAN) resin, which is the base resin of the general-purpose ABS resin, has excellent chemical resistance, mechanical properties, transparency, and compatibility with ABS, etc. but has relatively poor thermal resistance and not easily applicable in heat-resistant ABS used at high temperatures.

To remedy such a disadvantage of a SAN resin, methods of improving the thermal resistance of a SAN resin by using a monomer such as α-methylstyrene, vinyltoluene, and t-butyl styrene are being used. In particular, a method of using an α-methylstyrene monomer is the method mainly used.

However, such α-methylstyrene polymerizes at a very low temperature due to a low depolymerization temperature thereof, which leads to a low rate of polymerization and a low conversion rate.

Other methods for improving the thermal resistance of a SAN resin include a method of employing an acrylate ester monomer capable of copolymerization, such as methyl acrylate and ethyl acrylate, and a method of producing a SAN resin by copolymerizing a maleic anhydride with styrene. A polymer produced as such is representative of an alternating-type copolymer and exhibits high thermal resistance. However, in reality the polymer has very limited applicability due to the anhydride functional group included therein that leads to poor weather resistance and inevitable severe thermal deformation such as thermal decomposition that may lead to the generation of gas.

To solve this problem, a method of using a thermally stable cyclic imide group has recently gained popularity. Copolymers based on a maleimide (PMI; phenylmaleimide), which is representative of cyclic imides, generally exhibit high thermal resistance, undergo pyrolysis at high temperature, and may be blended with various thermoplastic resins to significantly improve the thermal resistance of the resins.

However, the production of the maleimide-based SAN resin requires high polymerization temperature, and thus large amounts of oligomers and PMI by-products are generated during the polymerization. Therefore, the processing of the resin results in a finished product with low surface quality and generates harmful gas that adversely affects the work environment of workers. In addition, a large amount of the PMI contained in the resin causes a reaction with styrene during the preparation of a polymerization solution, thereby results in poor process stability and low quality.

In order to solve the problems addressed above, the inventors of the present invention have come to develop a SAN resin that exhibits significantly improved thermal resistance and, at the same time, can be produced at high productivity and is highly processable and highly moldable; and a method for producing such a SAN resin by significantly reducing the amounts of oligomers contained in the SAN resin.

(Patent Document 1) Korean Laid-open Patent Application No. 10-2011-0042713 (Published on Apr. 27, 2011)

DETAILED DESCRIPTION OF THE INVENTION

Technical Problem

The present invention has been made to solve the aforementioned problems of the conventional art. An object of the present invention is to provide a method for producing a SAN resin, the method capable of inhibiting the production of PMI by-products and producing a SAN resin containing lower amounts of oligomers through a process of preparing a polymerization solution in which a solution containing a mixture of an N-substituted maleimide monomer and an unsaturated nitrile monomer is prepared and stored at a particular temperature to inhibit a side reaction between the N-substituted maleimide monomer and the unsaturated nitrile monomer, and separately introducing the solution containing a mixture of an N-substituted maleimide monomer and an unsaturated nitrile monomer and a styrene monomer into a polymerization reactor to prevent the N-substituted maleimide monomer and the styrene monomer from contacting each other.

Another object of the present invention is to provide a method for producing a SAN resin with uniform composition, the method capable of inhibiting nonuniform polymerization and producing a SAN resin containing lower amounts of oligomers through a process of homogeneously mixing the solution containing a mixture of an N-substituted maleimide monomer and an unsaturated nitrile monomer and the styrene monomer using a stirrer disposed at the front end of the polymerization reactor to prepare a polymerization solution, and introducing the polymerization solution into the polymerization reactor.

Still another object of the present invention is to provide a method for producing a SAN resin, the method capable of producing a SAN resin containing lower amounts of oligomers while maintaining an appropriate conversion rate by maintaining a first polymerization reactor and a second polymerization reactor at a particular respective temperature.

Yet another object of the present invention is to provide a SAN resin that is produced by the production method described above, contains lower amounts of oligomers, and exhibits improved thermal resistance.

Technical Solution

To achieve the objects, the present invention provides a method for producing a SAN resin, the method including the processes of:

1) preparing a solution containing a mixture of an N-substituted maleimide monomer and an unsaturated nitrile monomer; 2) preparing a polymerization solution containing the above solution and a styrene monomer; 3) carrying out a polymerization reaction by introducing the polymerization solution into a first polymerization reactor and then into a second polymerization reactor; and 4) transferring polymerization products to a devolatilization tank after the polymerization reaction, wherein the polymerization solution is prepared by separately introducing the styrene monomer and the solution containing a mixture of an N-substituted maleimide monomer and an unsaturated nitrile monomer into a static mixer disposed at the front end of the first polymerization reactor.

In addition, the present invention provides a SAN resin that is produced by the production method described above and contains oligomers at 0.1 to 0.5 parts by weight with respect to 100 parts by weight of the SAN resin.

Advantageous Effects of the Invention

The method for producing a SAN resin according to the present invention can produce a SAN resin containing significantly lower amounts of oligomers by preparing and storing a solution containing a mixture of an N-substituted maleimide monomer and an unsaturated nitrile monomer at a particular temperature, separately introducing the above solution and a styrene monomer into a polymerization reactor, mixing the same solution and the styrene monomer immediately before polymerization and then introducing the mixture into a polymerization reactor, and maintaining a first polymerization reactor and a second polymerization reactor at particular respective temperatures. In this way, it is possible to obtain a SAN resin that exhibits significantly improved thermal resistance and, at the same time, can be produced at high productivity and is highly processable and highly moldable.

DESCRIPTION OF THE DRAWINGS

The accompanying drawing incorporated herein serves to illustrate exemplary embodiments of the present invention in detail and, together with the description of the invention provided herein, facilitates understanding of the technical spirit of the present invention. Therefore, the present invention should not be construed as being limited to the description provided by the drawing.

FIG. 1 is a schematic view for illustrating the processes of producing a SAN resin according to one exemplary embodiment of the present invention.

MODE OF THE INVENTION

Hereinafter, the present invention will be described in detail to facilitate understanding of the present invention. In this case, the terms or words used herein and in the claims should not be restrictively construed according to their ordinary or dictionary meaning, and, based on the principle that the inventor can appropriately define concepts of terms for describing his/her invention in the best way, should be interpreted to have the meaning and concept that are consistent with the technical spirit of the present invention.

According to one exemplary embodiment of the present invention, the method for producing a SAN resin with high thermal resistance includes the processes of:

1) preparing a solution containing a mixture of an N-substituted maleimide monomer and an unsaturated nitrile monomer; 2) preparing a polymerization solution containing the above solution and a styrene monomer; 3) carrying out a polymerization reaction by introducing the polymerization solution into a first polymerization reactor and then into a second polymerization reactor; and 4) transferring polymerization products to a devolatilization tank after the polymerization reaction.

In this case, the polymerization solution is prepared by separately introducing the solution containing a mixture of an N-substituted maleimide monomer and an unsaturated nitrile monomer and the styrene monomer into a static mixer disposed at the front end of the first polymerization reactor.

Hereinafter, the method for producing a SAN resin with high thermal resistance according to one exemplary embodiment of the present invention will be described in detail with reference to FIG. 1.

Process 1)

According to one exemplary embodiment of the present invention, the process 1) is a process for preparing a solution containing a mixture of an N-substituted maleimide monomer and an unsaturated nitrile monomer and is carried out by dissolving the N-substituted maleimide monomer, which is in a solid state, into the unsaturated nitrile monomer, which is in a liquid state.

As described above, the method for producing a SAN resin according to the present invention includes a process of preparing a polymerization solution to be introduced into a polymerization reactor, wherein the solution containing a mixture of an N-substituted maleimide monomer and an unsaturated nitrile monomer is prepared separately from a styrene monomer to prevent the N-substituted maleimide monomer and the styrene monomer from contacting each other before polymerization. Therefore, the method prevents a side reaction that may produce substances inhibiting polymerization, and thus prevents the generation of oligomers, and thereby produces a final SAN resin with improved thermal resistance.

In the present invention, the term "oligomer" refers to the dimers and trimers of monomers, and low-molecular polymers having a molecular weight of 1000 or less.

As the N-substituted maleimide monomer that may be used for preparing the solution containing a mixture of an N-substituted maleimide monomer and an unsaturated nitrile monomer according to the present invention, one or more selected from the group consisting of N-phenylmaleimide, maleimide, N-methylmaleimide, N-ethylmaleimide, N-propylmaleimide, N-isopropylmaleimide, N-butylmaleimide, N-isobutylmaleimide, N-t-butylmaleimide, N-cyclohexylmaleimide, N-chlorophenylmaleimide, N-methylphenylmaleimide, N-bromophenylmaleimide, N-naphthylmaleimide, N-laurylmaleimide, N-hydroxyphenylmaleimide, N-methoxyphenylmaleimide, N-carboxyphenylmaleimide, N-nitrophenylmaleimide, and N-benzylmaleimide may be used. More specifically, the N-substituted maleimide monomer may be N-phenylmaleimide.

Also, as the unsaturated nitrile monomer that may be used for producing the solution containing a mixture of an N-substituted maleimide monomer and an unsaturated nitrile monomer according to the present invention, one or more selected from the group consisting of acrylonitrile, methacrylonitrile, ethacrylonitrile, phenylacrylonitrile, and α-chloroacrylonitrile may be used. More specifically, the unsaturated nitrile monomer may be acrylonitrile.

In addition, according to one exemplary embodiment of the present invention, when the solution containing a mixture of an N-substituted maleimide monomer and an unsaturated nitrile monomer is prepared and stored at a particular temperature, the effect of inhibiting the generation of oligomers, which is an object of the present invention, may be maximized.

More specifically, the solution containing a mixture of an N-substituted maleimide monomer and an unsaturated nitrile monomer according to the present invention is stored at a temperature of 50 to 70° C. When the solution is stored in a container at a temperature of below 50° C., the N-substituted maleimide monomer may not be completely dissolved in the unsaturated nitrile monomer. On the other hand, when the solution is stored in a container at a temperature of higher than 70° C., the N-substituted maleimide monomer may lose stability and thus be converted into succinimide, which is a by-product, or more oligomers may be generated due to a side reaction with the unsaturated nitrile monomer, which may also result in a final SAN resin containing more oligomers.

According to one exemplary embodiment of the present invention, the a solution containing a mixture of an N-substituted maleimide monomer and an unsaturated nitrile monomer may contain the N-substituted maleimide monomer and the unsaturated nitrile monomer in an appropriate ratio. The N-substituted maleimide monomer may be contained at 40 to 60 parts by weight with respect to 100 parts by weight of the above solution, and the unsaturated nitrile monomer may also be contained at 40 to 60 parts by weight with respect to 100 parts by weight of the same solution.

Process 2)

The process 2) according to one exemplary embodiment of the present invention is a process for preparing a polymerization solution containing a styrene monomer and the solution containing a mixture of an N-substituted maleimide monomer and an unsaturated nitrile monomer and is carried out by mixing the solution containing a mixture of an N-substituted maleimide monomer and an unsaturated nitrile monomer prepared in the process 1) with a styrene monomer.

As noted above, since the present invention produces a SAN resin containing lower amounts of oligomers by preventing the N-substituted maleimide monomer and the styrene monomer from contacting each other before polymerization and causing a side reaction, the polymerization solution may be prepared immediately before polymerization by separately introducing the styrene monomer and the solution containing a mixture of an N-substituted maleimide monomer and an unsaturated nitrile monomer into a static mixer at the front end of the first polymerization reactor.

As the styrene monomer that may be used for preparing the polymerization solution according to the present invention, one or more selected from the group consisting of styrene, α-methylstyrene, p-bromostyrene, p-methyl styrene, p-chlorostyrene, and o-bromostyrene may be used. More specifically, the styrene monomer may be styrene.

Each of the monomers may be contained in an appropriate amount in the polymerization solution so that a heat-resistant SAN resin with more homogeneous composition is produced and the inhibition of oligomer generation and improvement of thermal resistance is maximized.

Specifically, the polymerization solution may contain the N-substituted maleimide monomer at 10 to 20 parts by weight, the unsaturated nitrile monomer at 10 to 15 parts by weight, and the styrene monomer at 30 to 40 parts by weight with respect to the total weight of the polymerization solution.

The static mixer according to the present invention is disposed at the front end of the first polymerization reactor so that it can homogeneously mix the solution containing a mixture of an N-substituted maleimide monomer and an unsaturated nitrile monomer with the styrene monomer before being introduced into the polymerization reactor. When the solution and the styrene monomer are separately introduced into the polymerization reactor without using a static mixer, nonuniform polymerization may result, and thus the generation of oligomers may not be inhibited to a level desired by the present invention.

In addition, according to one exemplary embodiment of the present invention, the polymerization solution may further contain one or more additives selected from the group consisting of reaction solvents, initiators, molecular weight regulators, and antioxidants.

As the reaction solvent, one or more selected from the group consisting of ethylbenzene, toluene, xylene, methyl ethyl ketone, and methyl isobutyl ketone may be used. The reaction solvent may be contained in an amount of 30 to 50 parts by weight with respect to the total weight of the polymerization solution. When the content of the reaction solvent is below 30 parts by weight, viscosity may dramatically increase during polymerization. On the other hand, when the content of the polymerization solvent exceeds 50 parts by weight, much time and cost may be required for solvent removal, and thus low productivity may result.

As the initiator, one or more selected from the group consisting of azobisisobutyronitrile, benzoyl peroxide, t-butylperoxy-2-ethylhexanoate, cumyl peroxides, t-butyl peroxide, and 1,1-di(t-butylperoxy)cyclohexane may be used. The initiator may be contained in an amount of 0.01 to 0.05 parts by weight with respect to the total weight of the polymerization solution. When the content of the initiator is below 0.01 part by weight, polymerization is not carried out properly in the reactor, and a final resin with poorly balanced material properties may result. On the other hand, when the content of the initiator exceeds 0.05 parts by weight, viscosity may dramatically increase to a level that is disadvantageous for processing and dangerous.

As the molecular weight regulator, which is used for controlling the viscosity, particle size, and particle distribution of a resin by adjusting the molecular weight of the copolymer produced, one or more selected from the group consisting of n-dodecyl mercaptan, n-amyl mercaptan, t-butyl mercaptan, t-dodecyl mercaptan, n-hexyl mercaptan, n-octyl mercaptan, and n-nonyl mercaptan may be used. It is preferable that the molecular weight regulator be included in an amount of about 0.01 to 1.0 part by weight with respect to 100 parts by weight of the polymerization solution. When the content of the molecular weight regulator is below 0.01 part by weight, viscosity may dramatically increase to a level that is disadvantageous for the process, and thus a resin with poor material properties may be obtained. When the content of the molecular weight regulator exceeds 1.0 part by weight, polymerization may not occur, and thus a final SAN resin with poorly balanced material properties may result.

As the antioxidant, one or more selected from the group consisting of, for example, hindered phenol-based antioxidants and phosphorus-based antioxidants may be used. More specifically, Irgafos 168, Irganox 1076, Irganox 245, etc. may be used as the antioxidant. The antioxidant may be contained in an amount of 0.01 to 1.0 part by weight with respect to 100 parts by weight of the polymerization solution. When the content of the antioxidant is below 0.01 part by weight, thermal discoloration may occur during post-processing. On the other hand, when the content of the antioxidant exceeds 1.0 part by weight, problems such as low thermal resistance and product contamination due to the migration of the antioxidant during post-processing may result.

Process 3)

The process 3) is a process for producing a polymerization product according to one exemplary embodiment of the present invention. During the process 3), a polymerization reaction is carried out by introducing the polymerization solution into the first polymerization reactor and then into the second polymerization reactor.

According to one exemplary embodiment of the present invention, the polymerization reaction is carried out by a continuous bulk polymerization process using a polymerization reactor including two or more reactors aligned in series and can produce the final SAN resin at low cost and high efficiency.

More specifically, the solution containing a mixture of an N-substituted maleimide monomer and an unsaturated nitrile monomer and the styrene monomer are introduced into the static mixer through separate input lines and are mixed rapidly and homogeneously to produce the polymerization solution, and the polymerization solution passes through the first polymerization reactor and then into the second polymerization reactor to carry out polymerization.

In addition, in the method for producing a SAN resin according to the present invention, the first polymerization reactor and the second polymerization reactor are maintained at respective temperatures within a particular range to produce a SAN resin containing lower amounts of oligomers while maintaining an appropriate conversion rate.

Specifically, according to one exemplary embodiment of the present invention, the first polymerization reactor and the second polymerization reactor are controlled such that polymerization occurs in the reactors at a temperature of 100 to 125° C. and 110 to 135° C., respectively, wherein the temperature of the reactors may be controlled by a heating device disposed inside of each reactor.

Since a high conversion rate can be expected from the first polymerization reactor, when the temperature is raised to the polymerization temperature, excessive amounts of oligomers may be produced. Accordingly, polymerization should be carried out at a lower temperature in the first polymerization reactor compared to the second polymerization reactor, and the conversion rate should be maintained at an appropriate level by using an initiator. Therefore, when the temperature of the first polymerization reactor is below 100° C., polymerization takes place at an excessively low temperature, thus leading to an excessively low conversion rate, which may result in low productivity and low economic feasibility. On the other hand, when the temperature of the first polymerization reactor exceeds 125° C., excessive amounts of oligomers may be produced, and thus low thermal resistance may result.

In the second polymerization reactor, polymerization should be carried out at a higher temperature compared to the first polymerization reactor to compensate for the lower conversion rate in the second polymerization reactor compared to the first polymerization reactor. Therefore, when the temperature of the second polymerization reactor is below 110° C., a low conversion rate and poor flow of polymerization products may result. On the other hand, when the temperature of the second polymerization reactor exceeds 135° C., a SAN resin containing significantly large amounts of oligomers may be obtained.

Process 4)

The process 4) according to one exemplary embodiment of the present invention is a process in which the polymerization products are transferred to a devolatilization tank after polymerization. In the process 4), unreacted monomers and the reaction solvent are recovered and removed to produce a SAN resin in a pellet form.

In this case, the process of recovering and removing the unreacted monomers and the reaction solvent may be carried out at a point in which the polymerization conversion rate reaches 60 to 80%. When the polymerization conversion rate is below 60%, the unreacted monomers are present in a large amount and thus are removed with low efficiency. On the other hand, when the polymerization conversion rate exceeds 80%, viscosity and pressure increase such that the unreacted monomers and the reaction solvent may become difficult to remove. In this case, the polymerization conversion rate may be determined by collecting a sample of the polymerization products at one end of the second polymerization reactor.

The process of recovering and removing the unreacted monomers and the reaction solvent may be carried out at a temperature of 230 to 250° C. and a pressure of less than 30 torrs. When the unreacted monomers and the solvent are removed at a temperature of below 230° C., the unreacted monomers and the solvent may not be completely removed. On the other hand, when the unreacted monomers and the solvent are removed at a temperature exceeding 250° C., poor glass transition temperature and color properties may result. Also, when the unreacted monomers and the solvent are removed at a temperature and a pressure that are out of the aforementioned ranges of temperature and pressure, the unreacted monomers and the solvent are difficult to remove, which may result in large amounts of chemical compounds and solvent remaining in the resulting SAN resin, thus imparting poor material properties such as poor thermal resistance to the SAN resin.

In addition, it is preferable that the process of removing the unreacted monomers and the solvent be carried out until the content of the remaining chemical compounds in the reaction products reaches about 500 to 4000 ppm because, when the content of the chemicals remaining in the resulting SAN resin composition is out of this range, a final product of poor quality may result.

After the process of removing the unreacted monomers and the solvent, a process of extruding the resulting heat-resistant SAN resin into a pellet form may further be carried out as necessary.

The method for producing a heat-resistant SAN resin according to the present invention prepares and stores the solution containing a mixture of an N-substituted maleimide monomer and an unsaturated nitrile monomer at a particular temperature, introduces the solution and a styrene monomer into a polymerization reactor separately, mixes the above solution and the styrene monomer immediately before polymerization and then introduces the mixture into the polymerization reactor, and maintains the first polymerization reactor and the second polymerization reactor at particular respective temperatures. In this way, the method is effective in producing a SAN resin containing significantly lower amounts of oligomers and thus is effective in producing a SAN resin that exhibits significantly improved thermal resistance and, at the same time, can be produced at high productivity and is highly processable and highly moldable.

In addition, the present invention provides the SAN resin that is produced by the production method according to the present invention, contains oligomers in an amount of 0.1 to 0.5 parts by weight with respect to 100 parts by weight of the SAN resin, and has a glass transition temperature of 150 to 155° C.

The SAN resin produced by the production method according to the present invention contains significantly lower amounts of oligomers and thus exhibits significantly improved thermal resistance.

Hereinafter, the exemplary embodiments of the present invention will be described in detail to facilitate understanding and reproduction by those skilled in the art. However, the present invention may be embodied in many different forms and should not be construed as being limited to the embodiments set forth herein.

Example 1

A solution of N-phenylmaleimide (PMI) and acrylonitrile (AN) (PMI+AM solution) was prepared by dissolving 55 parts by weight of PMI in 45 parts by weight of AN with respect to the total weight of the solution at a temperature of 61° C.

The PMI+AN solution prepared as thus, a styrene (SM), and toluene (TLN) were introduced into a static mixer at the front end of a first polymerization reactor at a rate of 2.1 kg/hr, 2.7 kg/hr, and 3.2 kg/hr, respectively. Then, to prepare a polymerization solution, an initiator (1,1-di(t-butylperoxy) cyclohexane) in an amount of 0.02 parts by weight with respect to the total feed amount of the polymerization solution (8 kg/hr) was introduced into the static mixer.

The polymerization solution was introduced into the first polymerization reactor, whose temperature was maintained at 120° C., and then into a second polymerization reactor, whose temperature was maintained at 130° C., to carry out a continuous bulk polymerization reaction. The polymerization products obtained as thus were subjected to the recovery and removal of unreacted monomers and reaction solvent at a temperature of 240° C. in a devolatilization tank and were then extruded to produce a SAN resin in a pellet form.

Examples 2 to 5, Comparative Examples 1 to 4

The SAN resins of Examples 2 to 5 and Comparative Examples 1 to 4 were produced by varying the conditions used to produce the SAN resin of Example 1 as shown in Table 1 provided below.

Experimental Example 1

The material properties of the resins produced according to Examples 1 to 5 and Comparative Examples 1 to 4 were comparatively analyzed as follows, and the results are listed in Table 1 provided below.

1) Oligomer Content (%)

The amounts of oligomers contained in each resin were determined by gel chromatography.

2) Glass Transition Temperature (° C.)

The glass transition temperature (Tg) was determined using 10 mg of each resin subjected to a rising temperature of 10° C./min and a nitrogen flow of 50 cc/min by using a Q20 differential scanning calorimeter (DSC) from TA Instruments.

TABLE 1

| Characteristics | | Example 1 | Example 2 | Example 3 | Example 4 | Example 5 |
|---|---|---|---|---|---|---|
| Composition ratio of PMI + AN solution | PMI:AN | 55:45 | 55:45 | 55:45 | 55:45 | 55:45 |
| Temperature of PMI + AN mixed solution (° C.) | | 61 | 52 | 61 | 61 | 61 |
| Feed amount of polymerization solution (kg/hr) | PMI + AN | 2.1 | 2.1 | 2.1 | 2.1 | 2.1 |
| | SM | 2.7 | 2.7 | 2.7 | 2.7 | 2.7 |
| | TLN | 3.2 | 3.2 | 3.2 | 3.2 | 3.2 |
| Passed through static mixer | | O | O | O | O | O |
| Temperature of polymerization reactors | First polymerization reactor | 120 | 120 | 125 | 105 | 120 |
| | Second polymerization reactor | 130 | 130 | 130 | 130 | 135 |
| Properties of heat-resistant resin | Oligomer (%) | 0.21 | 0.24 | 0.33 | 0.19 | 0.31 |
| | Tg (° C.) | 153 | 152 | 150 | 154 | 151 |

| Characteristics | | Comparative Example 1 | Comparative Example 2 | Comparative Example 3 | Comparative Example 4 |
|---|---|---|---|---|---|
| Composition ratio of PMI + AN solution | PMI:AN | 55:45 | 55:45 | 55:45 | 55:45 |
| Temperature of PMI + AN mixed solution (° C.) | | 75 | 62 | 58 | 59 |
| Feed amount of polymerization solution (kg/hr) | PMI + AN | 2.1 | 2.1 | 2.1 | 2.1 |
| | SM | 2.7 | 2.7 | 2.7 | 2.7 |
| | TLN | 3.2 | 3.2 | 3.2 | 3.2 |

TABLE 1-continued

|  |  |  |  |  |  |
|---|---|---|---|---|---|
| Passed through static mixer | | O | X | O | O |
| Temperature of polymerization reactors | First polymerization reactor | 120 | 120 | 130 | 120 |
| | Second polymerization reactor | 130 | 130 | 130 | 140 |
| Properties of heat-resistant resin | Oligomer (%) | 2.33 | 1.98 | 2.44 | 1.96 |
| | Tg (° C.) | 139 | 141 | 138 | 143 |

As shown in Table 1, the SAN resins of the examples, produced according to the production method of the present invention, generally have a lower oligomer content, a higher glass transition temperature, and remarkably improved thermal resistance compared to the SAN resins of the comparative examples.

(Effect of Temperature of PMI+AN Solution)

More specifically, the resins of Example 1 and Example 2, in which the PMI+AN solution was prepared within the temperature range according to the present invention, has a significantly lower oligomer content, a higher glass transition temperature, and improved thermal resistance compared to the resin of Comparative Example 1, in which the PMI+AN solution was prepared under the same conditions as in the present invention except at higher temperature than the present invention.

(Effect of Polymerization Solution Components Passing Through Static Mixer)

The resin of Example 1, in which the PMI+AN solution and the styrene monomer were passed through the static mixer at the front end of the polymerization reactor and were homogeneously mixed to produce a polymerization solution before being introduced into the reactor, has a significantly lower oligomer content, a higher glass transition temperature, and improved thermal resistance compared to the resin of Comparative Example 2, in which the polymerization solution components were not passed through the static mixer.

(Effect of Temperature of First and Second Polymerization Reactors)

The resins of Example 1 and Example 2, in which the temperatures of the first and second polymerization reactors were maintained within the temperature ranges of the present invention, had a significantly lower oligomer content, a higher glass transition temperature, and improved thermal resistance compared to the resins of Example 3 and Example 4, in which the first and second polymerization reactors were maintained at higher temperatures compared to the present invention.

Such results are based on the effects of preparing and storing the solution containing a mixture of an N-substituted maleimide monomer and an unsaturated nitrile monomer at a particular temperature, introducing the solution and a styrene polymer into the polymerization reactor separately, mixing the same solution and the styrene monomer before polymerization and then introducing them into the polymerization reactor, and maintaining the first polymerization reactor and the second polymerization reactor at particular respective temperatures. Based on the results, it can be confirmed that the method for producing a SAN resin according to the present invention is effective in producing a SAN resin containing significantly lower amounts of oligomers and thus is effective in producing a SAN resin that exhibits significantly improved thermal resistance and, at the same time, can be produced at high productivity and is highly processable and highly moldable.

It will be understood that the above description of the present invention is only exemplary and that the present invention can be variously modified by those skilled in the art without departing from the scope of the present invention and without changing essential features. Therefore, the above-described embodiments should be considered as being exemplary in every sense and not for purposes of limitation.

The invention claimed is:

1. A method for producing a styrene-acrylonitrile resin, the method comprising:
   1) preparing a solution containing a mixture of an N-substituted maleimide monomer and an unsaturated nitrile monomer;
   2) preparing a polymerization solution that contains a styrene monomer and the solution containing a mixture of an N-substituted maleimide monomer and an unsaturated nitrile monomer;
   3) carrying out a polymerization reaction by introducing the polymerization solution into a first polymerization reactor and then into a second polymerization reactor; and
   4) transferring polymerization products to a devolatilization tank after the polymerization reaction,
   wherein the polymerization solution is prepared by separately introducing the styrene monomer and the solution containing a mixture of an N-substituted maleimide monomer and an unsaturated nitrile monomer into a static mixer at a front end of the first polymerization reactor.

2. The method for producing a styrene-acrylonitrile resin according to claim 1, wherein the solution containing a mixture of an N-substituted maleimide monomer and an unsaturated nitrile monomer is stored at a temperature of 50 to 70° C.

3. The method for producing a styrene-acrylonitrile resin according to claim 1, wherein the N-substituted maleimide monomer is one or more selected from the group consisting of N-phenylmaleimide, maleimide, N-methylmaleimide, N-ethylmaleimide, N-propylmaleimide, N-isopropylmaleimide, N-butylmaleimide, N-isobutylmaleimide, N-t-butylmaleimide, N-cyclohexylmaleimide, N-chlorophenylmaleimide, N-methylphenylmaleimide, N-bromophenylmaleimide, N-naphthylmaleimide, N-laurylmaleimide, N-hydroxyphenylmaleimide, N-methoxyphenylmaleimide, N-carboxyphenylmaleimide, N-nitrophenylmaleimide, and N-benzylmaleimide.

4. The method for producing a styrene-acrylonitrile resin according to claim 1, wherein the unsaturated nitrile monomer is one or more selected from the group consisting of acrylonitrile, methacrylonitrile, ethacrylonitrile, phenylacrylonitrile, and α-chloroacrylonitrile.

5. The method for producing a styrene-acrylonitrile resin according to claim 1, wherein the styrene monomer is one or more selected from the group consisting of styrene, α-methylstyrene, p-bromostyrene, p-methylstyrene, p-chlorostyrene, and o-bromostyrene.

6. The method for producing a styrene-acrylonitrile resin according to claim 1, wherein polymerization in the first polymerization reactor occurs at a temperature of 100 to 125° C.

7. The method for producing a styrene-acrylonitrile resin according to claim 1, wherein polymerization in the second polymerization reactor occurs at a temperature of 110 to 135° C.

8. The method for producing a styrene-acrylonitrile resin according to claim 1, wherein the polymerization solution further contains one or more additives selected from the group consisting of a reaction solvent, an initiator, a molecular weight regulator, and an antioxidant.

9. The method for producing a styrene-acrylonitrile resin according to claim 8, wherein the reaction solvent is one or more selected from the group consisting of ethylbenzene, toluene, xylene, methyl ethyl ketone, and methyl isobutyl ketone.

10. The method for producing a styrene-acrylonitrile resin according to claim 8, wherein the initiator is one or more selected from the group consisting of azobisisobutyronitrile, benzoyl peroxide, t-butylperoxy-2-ethylhexanoate, cumyl peroxides, t-butyl peroxide, and 1,1-di(t-butylperoxy)cyclohexane.

11. The method for producing a styrene-acrylonitrile resin according to claim 8, wherein the molecular weight regulator is one or more selected from the group consisting of n-dodecyl mercaptan, n-amyl mercaptan, t-butyl mercaptan, t-dodecyl mercaptan, n-hexyl mercaptan, n-octyl mercaptan, and n-nonyl mercaptan.

12. The method for producing a styrene-acrylonitrile resin according to claim 1, wherein the devolatilization tank is maintained at a temperature of 230 to 250° C. and a pressure of less than 30 torr.

13. A styrene-acrylonitrile resin produced by the method according to claim 1, which contains an oligomer in an amount of 0.1 to 0.5 part by weight with respect to 100 parts by weight of the styrene-acrylonitrile resin and has a glass transition temperature of 150° C. or more.

* * * * *